United States Patent
Redding et al.

(10) Patent No.: US 8,984,752 B2
(45) Date of Patent: Mar. 24, 2015

(54) PRINTHEAD FABRICATION USING ADDITIVE MANUFACTURING TECHNIQUES

(75) Inventors: Gary D. Redding, Victory, NY (US); Mark A. Cellura, Webster, NY (US); Bryan R. Dolan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 76 days.

(21) Appl. No.: 13/490,053

(22) Filed: Jun. 6, 2012

(65) Prior Publication Data

US 2013/0328975 A1 Dec. 12, 2013

(51) Int. Cl.
 *B21D 53/76* (2006.01)
 *B41J 2/15* (2006.01)
 *B41J 2/145* (2006.01)
 *B41J 2/14* (2006.01)
 *B41J 2/16* (2006.01)

(52) U.S. Cl.
 CPC .............. *B41J 2/14233* (2013.01); *B41J 2/161* (2013.01); *B41J 2/1623* (2013.01); *B41J 2002/14241* (2013.01); *B41J 2002/14403* (2013.01); *Y10T 29/49401* (2013.01)
 USPC ............................... 29/890.1; 347/40; 347/44

(58) Field of Classification Search
 CPC ...... B41J 2/1603; B41J 2/1626; B41J 2/1631; B41J 2/1623; B41J 2/14233; B41J 2/161
 USPC ...................... 29/890.1; 347/40, 44
 See application file for complete search history.

(56) References Cited

U.S. PATENT DOCUMENTS

| | | | | |
|---|---|---|---|---|
| 6,073,321 | A * | 6/2000 | Kitahara et al. | 29/25.35 |
| 6,523,236 | B1 * | 2/2003 | Nishikawa et al. | 29/890 |
| 6,862,783 | B2 * | 3/2005 | Nishikawa et al. | 29/25.35 |
| 7,735,225 | B2 * | 6/2010 | Nystrom et al. | 29/890.1 |
| 7,891,064 | B2 * | 2/2011 | Kang et al. | 29/25.35 |
| 8,727,504 | B2 * | 5/2014 | Palmieri | 347/68 |
| 2009/0202083 | A1 * | 8/2009 | Kageyama | 381/59 |
| 2013/0328975 | A1 * | 12/2013 | Redding et al. | 347/71 |

OTHER PUBLICATIONS

Hays et al., "Printhead Fluid Paths Formed With Sacrificial Material Patterned Using Additive Manufacturing Processes", U.S. Appl. No. 13/397,809, filed Feb. 16, 2012.

* cited by examiner

*Primary Examiner* — David Angwin
(74) *Attorney, Agent, or Firm* — MH2 Technology Law Group LLP (57) ABSTRACT

A method for forming a printhead including one or more channels. The method can include depositing and selectively sintering a first layer of powder into a sintered layer that forms a first discrete cross-sectional region of a printhead structure for the printhead. A plurality of layers of powder can be sequentially deposited and selectively sintered into a plurality of sintered layers that form discrete cross-sectional regions of the printhead structure and form at least a portion of at least one or more channels. Each of the plurality of layers of powder is deposited directly onto at least one sintered layer. Each of the plurality of sintered layers is integrally bonded to at least one other sintered layer.

14 Claims, 7 Drawing Sheets

PRINTHEAD FABRICATION USING ADDITIVE MANUFACTURING TECHNIQUES

TECHNICAL FIELD

The subject matter of this disclosure relates to the field of printing devices, and more particularly to printing devices including printheads such as ink jet printheads.

BACKGROUND

Printing images onto a print medium such as paper for consumer and industrial use is dominated generally by laser technology and ink jet technology. Ink jet technology has become more common as ink jet printing resolution and print quality have increased. Ink jet printers typically use either thermal ink jet technology or piezoelectric technology. Even though they are more expensive to manufacture than thermal ink jets, piezoelectric ink jets are generally favored because they can use a wider variety of inks.

Piezoelectric ink jet printheads typically include a flexible diaphragm manufactured from stainless steel. Piezoelectric ink jet printheads can also include an array of piezoelectric transducers attached to the diaphragm. Other printhead structures can include one or more laser-patterned dielectric stand-off layers and a flexible printed circuit ("flex circuit") or printed circuit board ("PCB") electrically coupled with each transducer. A printhead can further include a body plate, an inlet/outlet plate, and an aperture plate, each of which can be manufactured from stainless steel. The aperture plate includes an array of nozzles (i.e., one or more openings, apertures, or jets) through which ink is dispensed during printing.

During use of a piezoelectric printhead, a voltage is applied to a piezoelectric transducer, typically through electrical connection with a flex circuit electrode electrically coupled to a voltage source, which causes the piezoelectric transducer to bend or deflect, resulting in a flexing of the diaphragm. Diaphragm flexing by the piezoelectric transducer increases pressure within an ink chamber and expels a quantity of ink from the chamber through a particular nozzle in the aperture plate. As the diaphragm returns to its relaxed (i.e., unflexed) position, it reduces pressure within the chamber and draws ink into the chamber from a main ink reservoir through an opening to replace the expelled ink.

The complex three-dimensional microfluidic channels (e.g., ink ports) for ink jet printheads can be fabricated by assembling multiple layers which can include a number of different materials such as one or more laser patterned polymers, etched stainless steel layers, and aluminum layers. The manufacturing process can include stacking the layers within a press and applying high pressure and temperature. Multiple adhesive films are used to effect bonding of the material layers together. An adhesive cure cycle can include the application of the pressure and temperature on the layer stack within the press for an extended duration of time, for example two hours, to minimize delamination of the layers and premature failure of the printhead during use. The adhesives which bond the various printhead layers together are formulated for both their bonding reliability and their compatibility with solid and ultraviolet inks.

SUMMARY

The following presents a simplified summary in order to provide a basic understanding of some aspects of one or more embodiments of the present teachings. This summary is not an extensive overview, nor is it intended to identify key or critical elements of the present teachings or to delineate the scope of the disclosure. Rather, its primary purpose is merely to present one or more concepts in simplified form as a prelude to the detailed description presented later.

According to various embodiments, the present teachings include a method for forming a printhead structure that includes selectively fusing (e.g., sintering, melting, and the like) layers of metal powder to additively manufacture the printhead structure or a component thereof, where the printhead structure includes an ink chamber or channel configured for the supply of ink to a printhead or the flow of ink through the printhead. The method includes selectively sintering a first layer of powder of a material to form a first sintered layer, where the first layer is sintered selectively to correspond to a first cross-sectional region of a printhead structure. The method further includes sequentially forming additional sintered layers, by depositing each additional layer of powder of the material onto a previously sintered layer and then selectively sintering that additional layer of powder to form an additional sintered layer integrally bonded to the previously sintered layer, where that additional layer is sintered selectively to correspond to a respective cross-sectional region of the printhead structure adjacent to the cross-sectional region of the previously sintered layer. The printhead structure can include, for example, a jet stack, an external manifold, and the like.

In various embodiments of the present teachings, an ink jet printhead can include a printhead structure, such as a jet stack, formed from one or more additively manufactured parts, wherein the additively manufactured parts can be formed by selectively sintering layers of metal powder. The additively manufactured parts can be formed upon a base layer, such as, for example, one or more printhead diaphragms. The additively manufactured parts can have a plurality of ink channels formed therethrough, wherein the plurality of ink channels are configured for the passage of ink from the diaphragms integrated to the printhead structure to a plurality of nozzles in an aperture plate during printhead printing.

In further embodiments of the present teachings, an ink jet printhead can include a manifold formed from one or more additively manufactured parts, wherein the additively manufactured parts can be formed by selectively sintering layers of metal powder. The formed manifold can be external or internal relative to a jet stack of the printhead. The additively manufactured parts can have a plurality of ink chambers formed therein and channels formed therethrough, wherein the plurality of ink chambers and channels are configured for the supply of ink from an ink source to the printhead.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

It should be noted that some details of the figures have been simplified and are drawn to facilitate understanding of the present teachings rather than to maintain strict structural accuracy, detail, and scale.

DESCRIPTION OF THE EMBODIMENTS

Reference will now be made in detail to the exemplary embodiments of the present teachings, examples of which are illustrated in the accompanying drawings. Wherever possible, the same reference numbers will be used throughout the drawings to refer to the same or like parts. Electrical, mechanical, logical and structural changes can be made to the embodiments without departing from the spirit and scope of the present teachings. The following detailed description is, therefore, not to be taken in a limiting sense and the scope of the present teachings is defined by the appended claims and their equivalents.

As used herein unless otherwise specified, the word "printer" encompasses any apparatus that performs a print outputting function for any purpose, such as a digital copier, a bookmaking machine, a facsimile machine, a multi-function machine, a plotter, and the like. The word "polymer" encompasses any one of a broad range of carbon-based compounds formed from long-chain molecules including thermosets, thermoplastics, resins such as polycarbonates, epoxies, and related compounds known to the art.

One manufacturing process for fabricating ink jet printhead structures involves laminating or brazing many layers of patterned metal or polymer sheets, which can reach twenty-five or more layers of structural material (e.g., metals, polymers, and the like) and adhesives (e.g., thermoplastics, B-staged acrylics, and the like). Each layer must be formed, for example, by the manufacturer or a supplier using various patterning, laser drilling, and punching techniques, transported to a printhead manufacturing facility if provided by a supplier, maintained in an inventory, and then cleaned, stacked, pressed, and bonded into printhead structures before being attached to an ink reservoir. Because most if not all of the layers are added one-at-a-time, more than twenty press cycles may be required to fabricate the printhead structures, resulting in long total throughput time and requiring multiple mechanical presses when manufacturing at production-level quantities.

Also, having a large number of layers and piece parts per printhead structure requires a large inventory that can be costly to maintain and manage, and shortages or defects in any of the layers or piece parts can cause a bottleneck in the manufacturing process. Furthermore, layer to layer alignment must be maintained, layer to layer bonding must be satisfactory, and cleanliness must be maintained throughout the process to prevent contamination from blocking the nozzles during use. Chemical formulations of the material layers and adhesives which connect the material layers together must be compatible with the ink that will come into contact with the material layers and the adhesives. The material layers can include stainless steel, aluminum, polyimide, and the like.

The adhesives which connect the layers together must be sufficiently reliable to prevent delamination of the different material layers, which can result from, for example, differences in the thermal coefficient of expansion during heating and cooling or from pressures within the printhead during use. In addition, interfaces between the large number of patterned material layers and adhesives often form sharp plate edges that can trap bubbles in the printhead structures during use and purge.

Moreover, having to laminate and braze many layers of patterned metal and polymer sheets causes design changes or enhancements to the printhead structures to be costly and inflexible. For instance, if an ink channel within the printhead structures needs to be re-routed, multiple layers and piece parts must be redesigned and refabricated. Because many of the layers and piece parts are made using a photo-etch process, new photo-masks are required to fabricate each redesigned layer or piece part.

Figure 9:
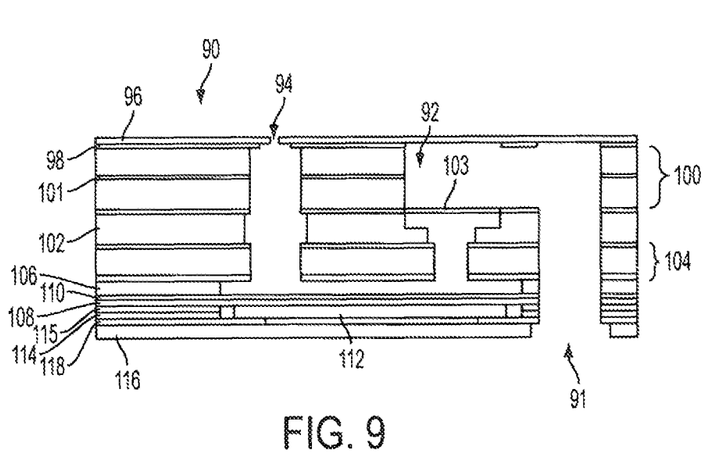
FIGS. 9 and 10 illustrate cross-sections of printhead structures formed using a plurality of laminated layers.
Figure 10:
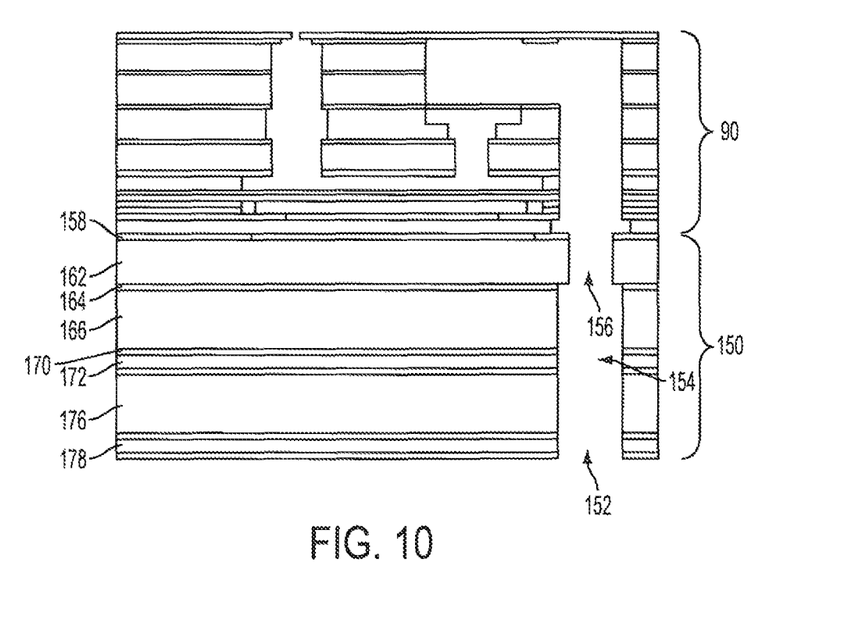

FIG. 9 depicts an ink jet printhead structure, and more particularly part of a jet stack 90 of the printhead structure, which can be formed by physically coupling multiple layers together using adhesive layers. FIG. 9 generally depicts an inlet port 91 and an ink port 92 for the supply and passage of ink from an ink source (not depicted for simplicity) to a nozzle (i.e., an aperture) 94 within an aperture plate 96 during printing. An aperture plate adhesive 98 couples aperture plate 96 to an inlet/outlet plate or manifold 100. Inlet/outlet plate 100 can include two or more patterned metal layers joined together by one or more brazed joints 101. The patterned metal layers can be made of aluminum, stainless steel, and the like. FIG. 9 further depicts a separator layer 102, a particle filter (e.g., a rock screen) 103 formed from a polymer layer that also joins inlet/outlet plate 100 to separator layer 102, a vertical inlet 104 which can include a plurality of layers, a body plate 106, a diaphragm layer 108 attached to body plate 106 with a diaphragm attach adhesive 110, one or more piezoelectric actuators (e.g., transducers) 112, a standoff layer 114 attached to diaphragm layer 108 with an adhesive layer 115, and a circuit layer 116 attached to standoff layer 114 and piezoelectric actuators 112 with an adhesive layer 118. Various other printhead layers can be included depending on the device design, which are not described for simplicity. For example, and as illustrated in FIG. 10 and described in greater detail infra, the printhead structure can include an external manifold 150 attached to jet stack 90. The printhead structure can have hundreds or thousands of ink ports 92 and nozzles 94 within aperture plate 96. To connect the various layers together, the printhead structure must be precisely aligned, gimbaled to maintain alignment, and placed into a stack press at a temperature of about 300° C. and a pressure of about 300 psi for about two hours to cure the adhesive.

FIG. 10 also depicts an ink jet printhead structure, and more particularly part of external manifold 150 attached to jet stack 90 of the printhead structure. Like jet stack 90, external manifold 150 can be formed by physically coupling multiple layers together using adhesive layers. FIG. 10 generally depicts a manifold inlet 152, a manifold chamber 154, and a manifold outlet 156 for the supply and passage of ink from an ink source (not depicted for simplicity) to jet stack 90 during printing. An adhesive layer 158 connects jet stack 90 to a manifold body, which can include two or more material layers 162, 166 joined together by one or more adhesive layers 164. FIG. 10 further depicts a separator layer 172 attached to the manifold body with an adhesive layer 170, and top layers 176, 178 attached to separator layer 172. Material layers 162, 166, separator layer 172, and top layers 176, 178 can include metals and polymers, such as stainless steel, aluminum, polyimide, and the like. For example, material layer 162 can be a stainless steel layer, material layer 166 can be an aluminum layer, separator layer 172 can be a polyimide layer, top layer 176 can be an aluminum layer, and top layer 178 can be a polyimide layer.

Embodiments of the present teachings can be used to form a printhead or a component thereof, such as a printhead structure or subassembly which is analogous to various elements of FIG. 9 or 10. Methods can include the use of additive manufacturing techniques to form a printhead structure having a reduced number of layers compared to some other printhead structures. Additive manufacturing techniques can include, for example, selective laser sintering such as direct metal laser sintering. In various embodiments, additive manufacturing techniques can be used to form one or more additively manufactured parts of a printhead structure. For example, and as discussed below, one or more additively manufactured parts can be formed using additive manufacturing techniques to replace various layers, such as inlet/outlet plate 100 forward up to and including diaphragm layer 108 of jet stack 90 as depicted in FIG. 9, and material layer 162 forward up to and including top layer 178 of external manifold 150 as depicted in FIG. 10. The additively manufactured parts can be formed by selectively fusing (e.g., sintering, melting, and the like) powder made of a fusible material, such as stainless steel, tool steel, aluminum and aluminum alloys, titanium and titanium alloys, copper and copper alloys, nickel-base superalloys, cobalt-chromium alloys (e.g., stellite alloys), and other metals.

Once the additively manufactured parts are formed, any finishing can be performed and the additively manufactured parts can be bonded or coupled to other printhead components such as actuators and aperture plates to form a front end of a jet stack or other layers to form an external manifold. The resulting printhead structure may have a reduced cost, improved yield, greater reliability, and longer lifetime than current printhead structures. Embodiments of the present teachings can be used to form printhead structures that are analogous to and/or provide functionality similar to that of printhead structures depicted in FIG. 9 or FIG. 10, but has a reduced number of layers and interfaces between the layers, which can result in reduced throughput time, fewer process steps, fewer mechanical presses and press cycles, and decreased material and energy costs required for printhead assembly.

By reducing the number of layers and piece parts, embodiments of the present teachings reduce the inventory count of layers and piece parts required for printhead assembly, and thus can reduce costs associated with inventory management, document control, and quality inspections required for maintaining the inventory, as well as reduce potential shortages or defects in any of the layers or piece parts that can cause a bottleneck during printhead assembly. Moreover, replacing multiple printhead layers with one or a few additively manufactured parts can enhance printhead layer alignment, thus reducing the need for norming and allowing for higher jet densities, as well as reducing or eliminating the need for expensive vision equipment used to align the multiple printhead layers. Replacing multiple printhead layers, which are typically bonded together with adhesives, with one or a few additively manufactured parts can reduce delamination of the bonded printhead layers and eliminate the need for certain adhesives that may be compatible with some inks but not others. Furthermore, additively manufactured parts in place of multiple printhead layers made of different materials can improve thermal uniformity of the printhead structure, and additively manufactured parts made of metal can require less energy to heat ink in the printhead structure.

Replacing multiple printhead layers with additively manufactured parts can also reduce the number of interfaces between the printhead layers that often form sharp plate edges, and thus can reduce the number of or eliminate sharp plate edges that can trap bubbles in the printhead structure during use and purge. In addition, additive manufacturing techniques such as direct metal laser sintering can produce rounded edges in the additively manufactured parts, thus reducing or eliminating bubble trapping in the printhead structure during use and purge.

Furthermore, additive manufacturing techniques facilitate rapid prototyping and manufacturing of the printhead structure, and thus enable "on-the-fly" design changes to the printhead structure. For instance, if an ink channel within the printhead structure needs to be re-routed, instead of having to redesign and refabricate multiple layers and piece parts that are typically made using photo-etch processes, designs for the additively manufactured parts can simply be modified and new additively manufactured parts can be fabricated on-the-fly from the modified designs. Additive manufacturing techniques can also permit different variations of the printhead structure to be rapidly designed and fabricated to accommodate many different platforms.

Figure 1:
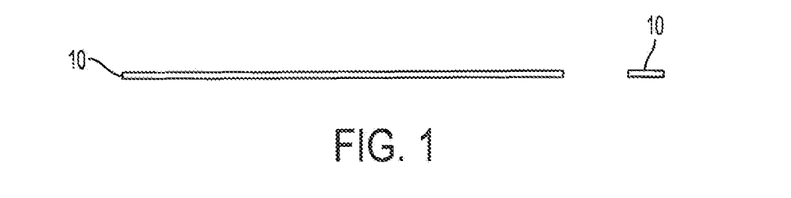
FIGS. 1-6 depict cross-sections of exemplary printhead structures being fabricated using an additive manufacturing technique, in accordance with various embodiments of the present teachings.

FIGS. 1-6 depict cross-sections of exemplary printhead structures being formed using an additive manufacturing technique, in accordance with various embodiments of the present teachings. FIG. 1 depicts a base layer 10 of a partially formed printhead structure, such as an ink jet stack, upon which an additively manufactured part of the printhead structure can be fabricated using an additive manufacturing technique, such as direct metal laser sintering ("DMLS") or any other selective laser sintering techniques. Base layer 10 can include a patterned layer comprising a material of the additively manufactured part, the material including, for example, stainless steel, tool steel, aluminum and aluminum alloys, titanium and titanium alloys, copper and copper alloys, nickel-base superalloy, cobalt-chromium alloy, etc., or a combination thereof. In various embodiments, base layer 10 can be a diaphragm layer analogous to diaphragm layer 108 as shown in FIG. 9.

Figure 3B:
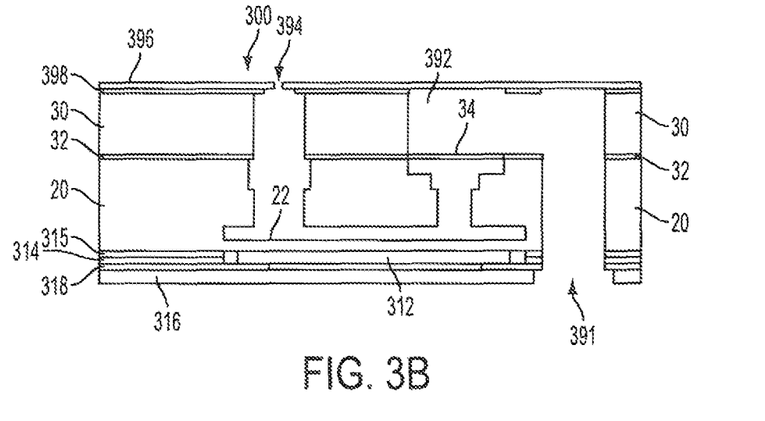
Figure 4B:
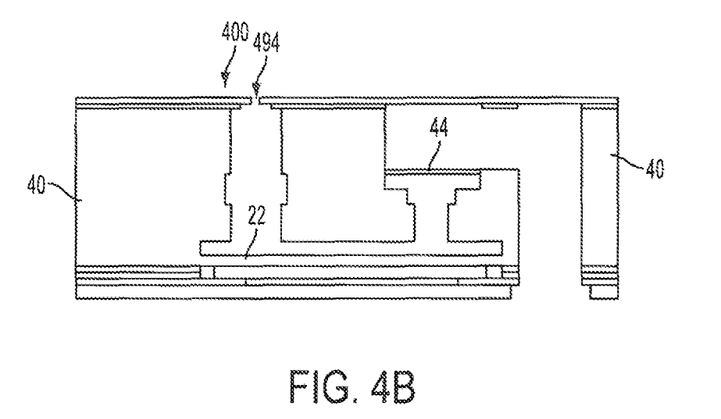
Figure 5:
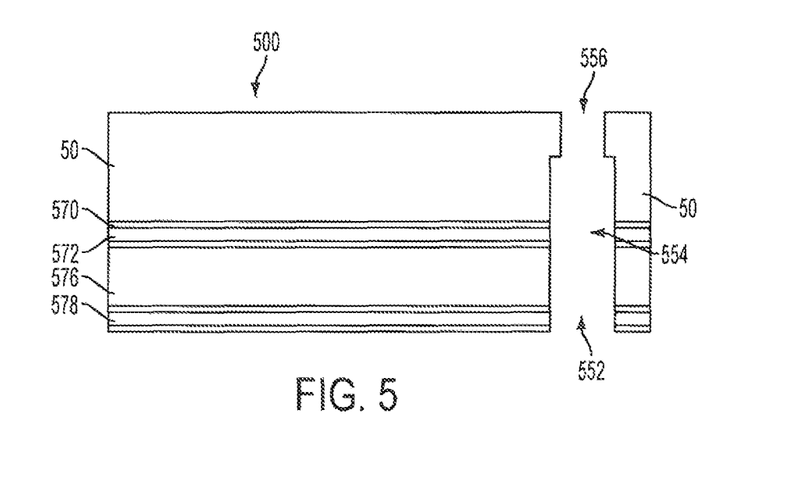

In various embodiments, base layer 10 can be formed by patterning a continuous planar material to correspond to a first discrete cross-sectional region of the additively manufactured part using, for example, a laser-etch technique or by masking then etching the continuous planar material with a wet or dry etch. Alternatively, base layer 10 can be formed by first depositing or dispensing a layer of the material in loose powder form on a platform, and then sintering, melting, fusing, or otherwise integrally bonding the layer of powder together in a selective manner such that the resultant base layer 10 corresponds to the first cross-sectional region of the additively manufactured part. The layer of powder can include fine particles of the material that are substantially uniform in particle size. The particle size can range from 1 µm to 50 µm, which can be selected based on the printhead structure for which the additively manufactured part is being fabricated. For instance, when fabricating a jet stack as depicted in FIGS. 3B and 4B and described in greater detail infra, the layer of powder can include 4 µm particles. For another instance, when fabricating an external manifold as depicted in FIG. 5 and described in greater detail infra, the layer of powder can include 20 µm particles.

Figure 2:
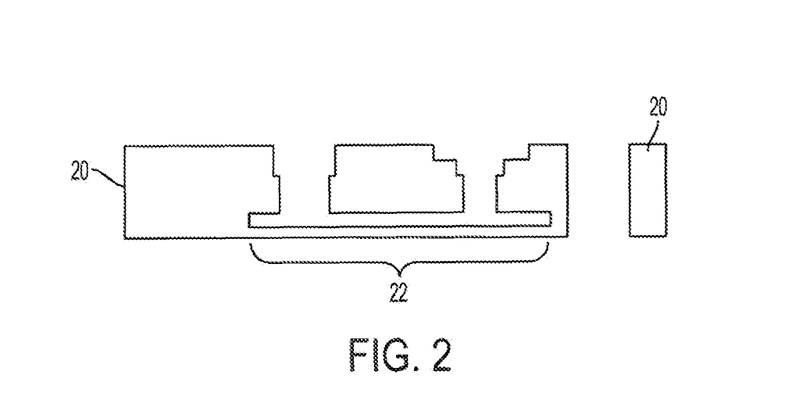

Next, as shown in FIG. 2, additional layers of the additively manufactured part can be formed in a layer-by-layer manner, by sequentially sintering the additional layers together to produce the additively manufactured part, such as a cohesive part 20 as shown in FIG. 2. In various embodiments, cohesive part 20 can include one or more diaphragms 22, which can be made from base layer 10 (as shown in FIG. 1). A first additional layer can be formed by depositing or dispensing a new layer of the material in loose powder form on base layer 10, and then sintering, melting, fusing, or otherwise integrally bonding the new layer of powder together and with base layer 10 in a selective manner, such that the first additional layer corresponds to a cross-sectional region of cohesive part 20 adjacent to base layer 10. Additional layers can then be sequentially formed by depositing or dispensing each additional layer of the material in loose powder form on a previously sintered layer, and then sintering, melting, fusing, or otherwise integrally bonding that additional layer of powder together and with the previously sintered layer in a selective manner, such that that additional layer corresponds to a respective cross-sectional region of cohesive part 20 adjacent to that of the previously sintered layer. Each layer of powder can include fine particles of the material that are substantially uniform in particle size.

In various embodiments, the additional layers can each be sintered selectively to correspond to a discrete cross-sectional region of cohesive part 20, which cumulatively form the three-dimensional configuration of cohesive part 20. Each discrete cross-sectional region has defined two-dimensional boundaries, and each region can have unique boundaries. The thickness of the additional layers can be constant, or can vary from one layer to another layer to maximize manufacturing efficiency (e.g., increased build speed, decreased energy usage, etc.) while satisfying various parameters and requirements (e.g., desired feature size and accuracy, controlled bulk porosity/density, desired strength and hardness, desired surface quality, etc.) for cohesive part 20. The three-dimensional configuration of cohesive part 20 can include one or more ink chambers or channels configured for the supply of ink to a printhead or the flow of ink through the printhead. The ink chambers and channels can form openings on one or more surfaces of cohesive part 20, and the orientation of the ink chambers and channels with respect to cohesive part 20 can be vertical, horizontal, or any combination thereof.

Figure 3A:
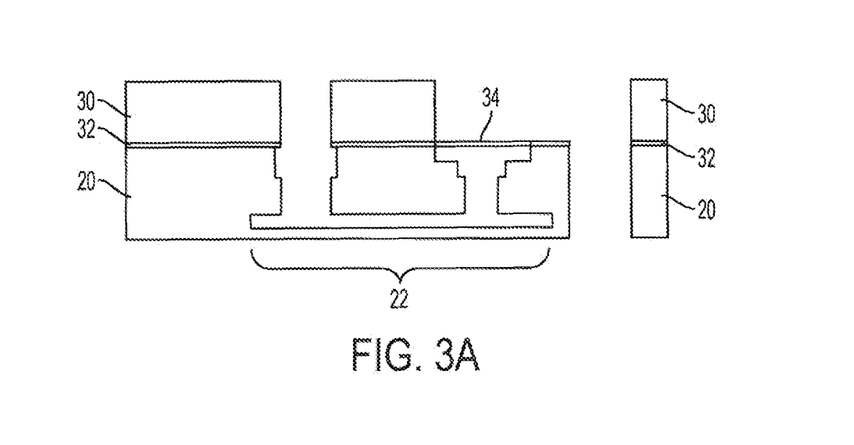

FIG. 3A depicts a partially formed printhead structure in which cohesive part 20 and another cohesive part 30 are joined together using a polymer layer 32. Polymer layer 32 can be patterned to form a particle filter (e.g., a rock screen) 34. Cohesive part 30 can be fabricated using the same material or a different material from that used to fabricate cohesive part 20. Cohesive part 30 can be additively manufactured in a layer-by-layer manner similar to that used to fabricate cohesive part 20. Polymer layer 32 can be formed from a polyimide material, such as DUPONT EU-100®, or other polymers including polyetherether ketone, polysulfone, polyester, polyethersulfone, polyimideamide, polyamide, polyethylenenaphthalene, etc. Polymer layer 32 can be a self-adhesive thermoplastic or have a thin layer of adhesive deposited on one or both sides. Alternatively, another thermoplastic or thermoset adhesive could be used to bond polymer layer 32 to cohesive part 20 and/or cohesive part 30.

FIG. 3B depicts a jet stack 300 that includes additively manufactured cohesive parts 20, 30 joined together using polymer layer 32. Jet stack 300 can also include one or more piezoelectric actuators (e.g., transducers) 312 adjacent to one or more diaphragms 22, a standoff layer 314 attached to cohesive part 20 with an adhesive layer 315, and a circuit layer 316 attached to standoff layer 314 and piezoelectric actuators 312 with an adhesive layer 318. Jet stack 300 can further include an aperture plate 396 attached to cohesive part 30 with an aperture plate adhesive 398. As shown in FIG. 3B, jet stack 300 can include an inlet port 391 and an ink port 392 for the supply and passage of ink from an ink source (not depicted for simplicity) to one or more nozzles (i.e., an aperture) 394 within aperture plate 396 during printing. Various other printhead layers can be included depending on the device design, which are not described for simplicity. Jet stack 300 can have hundreds or thousands of ink ports 392 and nozzles 394 within aperture plate 396.

In embodiments as shown in FIGS. 2, 3A, and 3B, the additively manufactured cohesive part 20 can replace various layers of jet stack 90 as shown in FIG. 9, such as separator layer 102, vertical inlet 104 which includes a plurality of material and adhesive layers, body plate 106, diaphragm layer 108, and diaphragm attach adhesive 110 that joins together body plate 106 and diaphragm layer 108. The additively manufactured cohesive part 30 can also replace various layers of jet stack 90 as shown in FIG. 9, such as inlet/outlet plate 100 that includes two or more patterned metal layers joined together by one or more brazed joints 101.

Figure 4A:
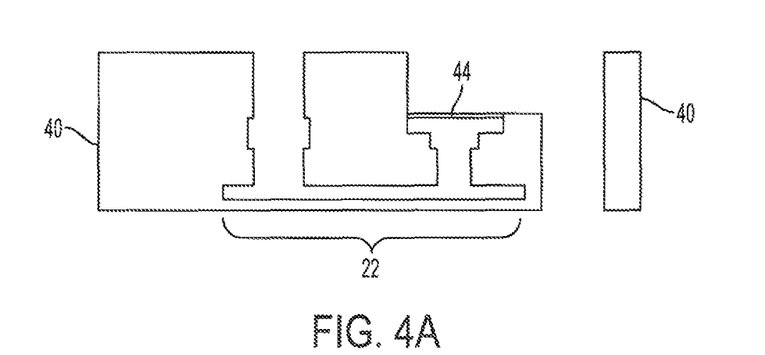

FIG. 4A depicts a partially formed printhead structure similar to that depicted in FIG. 3A, but without the polymer layer joining together disparate additively manufactured cohesive parts. For example, as shown in FIG. 4A, the partially formed printhead structure can include a cohesive part 40 additively manufactured in a layer-by-layer manner similar to that used to fabricate cohesive part 20. The three-dimensional configuration of cohesive part 40 can incorporate the design for a particle filter 44, so that during the additive manufacturing process, a select portion of cohesive part 40 can be patterned to form particle filter 44. FIG. 4B depicts a jet stack 400 similar to jet stack 300 depicted in FIG. 3B, but also without the polymer layer joining together disparate additively manufactured cohesive parts.

In embodiments as shown in FIGS. 4A and 4B, the additively manufactured cohesive part 40 can replace various layers of jet stack 90 as shown in FIG. 9, such as inlet/outlet plate 100 that includes two or more patterned metal layers joined together by one or more brazed joints 101, separator layer 102, the polymer layer that forms particle filter 103 and joins together inlet/outlet plate 100 and separator layer 102, vertical inlet 104 which includes a plurality of material and adhesive layers, body plate 106, diaphragm layer 108, and diaphragm attach adhesive 110 that joins together body plate 106 and diaphragm layer 108.

Figure 6:
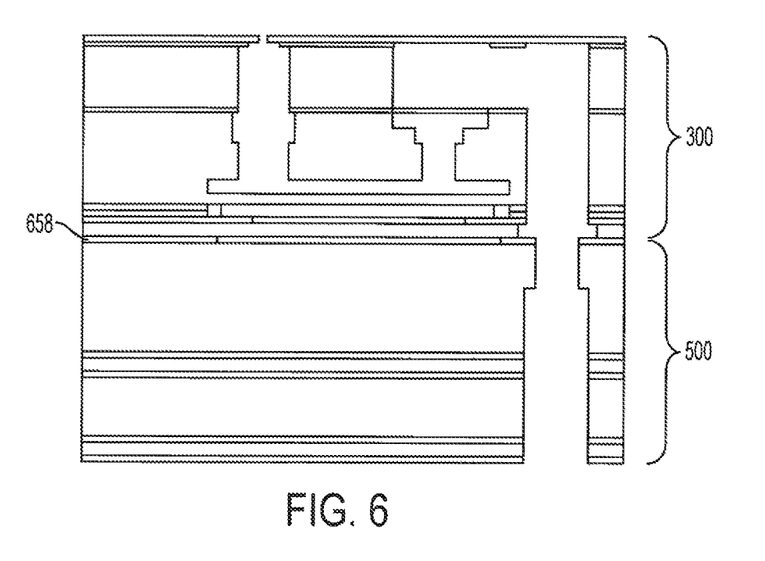

FIGS. 5 and 6 depict an external manifold 500 that includes an additively manufactured cohesive part 50, in accordance with various embodiments of the present teachings. Cohesive part 50 can be fabricated using the same material or a different material from that used to fabricate cohesive part 20 and/or cohesive part 30, and can be additively manufactured in a layer-by-layer manner similar to that used to fabricate cohesive parts 20, 30. External manifold 500 can have a manifold inlet 552, a manifold chamber 554, and a manifold outlet 556 for the supply and passage of ink from an ink source (not depicted for simplicity) during printing to another printhead structure, such as jet stack 300 as shown in FIGS. 3B and 6 or jet stack 400 as shown in FIG. 4B. External manifold 500 can have hundreds or thousands of manifold inlets 552 and manifold outlets 556.

As shown in FIG. 5, external manifold 500 can include cohesive part 50 attached to a separator layer 572 with an adhesive layer 570, and top layers 576, 578 attached to separator layer 572. Separator layer 572 and top layers 576, 578 can include metals and polymers, such as stainless steel, aluminum, polyimide, and the like. As shown in FIG. 6, external manifold 500 can be coupled to jet stack 300 using an adhesive layer 658. Various other printhead layers can be included depending on the device design, which are not described for simplicity. In embodiments as shown in FIGS. 5 and 6, the additively manufactured cohesive part 50 can replace various layers of external manifold 150 as shown in FIG. 10, such as the manifold body that includes two or more material layers 162, 166 joined together by one or more adhesive layers 164.

Figure 7:
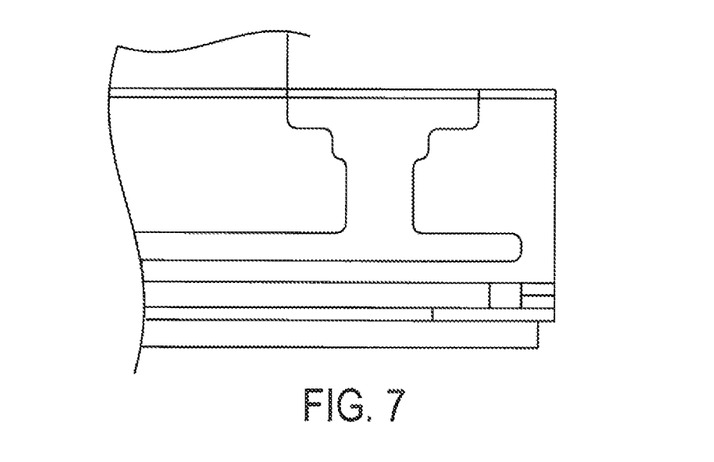
FIG. 7 depicts a close-up cross-section of an exemplary printhead structure fabricated using an additive manufacturing technique, in accordance with various embodiments of the present teachings.

FIG. 7 depicts a close-up cross-section of an exemplary printhead structure fabricated using an additive manufacturing technique, in accordance with various embodiments of the present teachings. Additive manufacturing techniques (e.g., direct metal laser sintering) can produce rounded edges in additively manufactured parts (e.g., cohesive parts 20, 30, 50), as shown in FIG. 7, and these rounded edges can reduce or eliminate bubble trapping during use and purge in printhead structures that include such additively manufactured parts.

Figure 8:
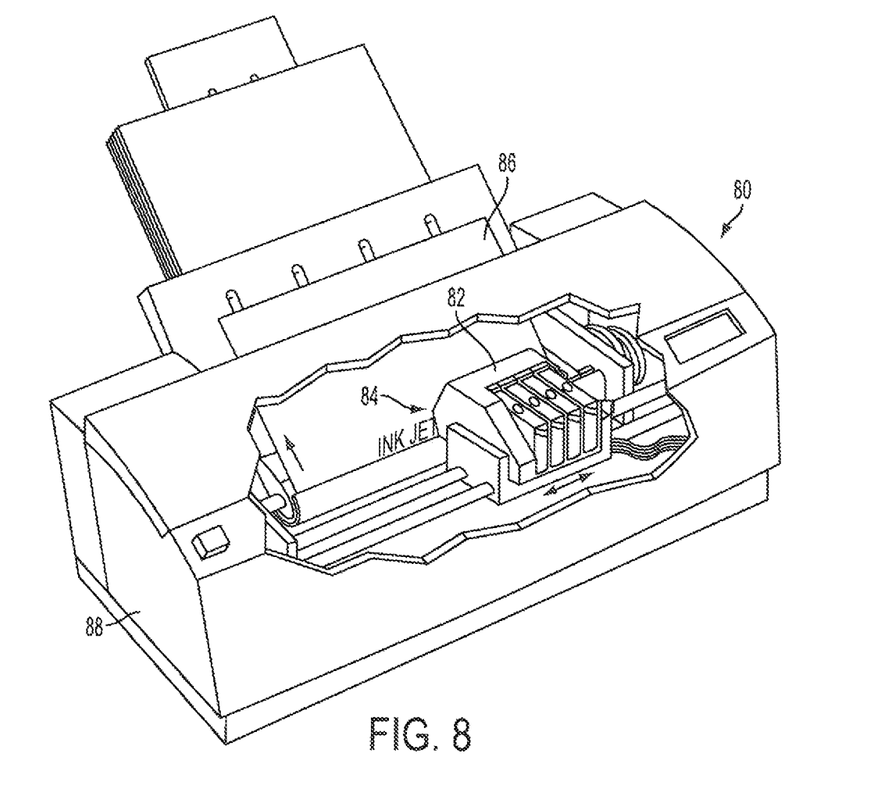
FIG. 8 is a perspective view of a printer having an exemplary printhead structure fabricated using an additive manufacturing technique, according to various embodiments of the present teachings.

Once the fabrication of the printhead structure is completed, one or more printheads according to the present teachings can be used to form a printer. FIG. 8 depicts a printer 80 including one or more printheads 82 and ink 84 being ejected from one or more nozzles 61 (e.g., nozzles 394, 494 as shown in FIGS. 3B and 4B, respectively). In various embodiments, printheads 82 can include jet stacks 300, 400 and/or external manifold 500. Printheads 82 are configured to operate in accordance with digital instructions to create a desired image on a print medium 86 such as a paper sheet, plastic, etc. Printheads 82 can move back and forth relative to print medium 86 in a scanning motion to generate the printed image swath by swath. Alternately, printheads 82 can be held fixed and print medium 86 moved relative to it, creating an image as wide as printheads 82 in a single pass. Printheads 82 can be narrower than, or as wide as, print medium 86. The printer hardware including printheads 82 can be enclosed in a printer housing 88. In another embodiment, printheads 82 can print to an intermediate surface such as a rotating drum or belt (not depicted for simplicity) for subsequent transfer to a print medium.

Thus, the various process embodiments described herein may allow the formation of a printhead structure which has a reduced components and material interfaces compared with some current methods and structures. In contrast to a printhead structure which can include many metal and polymer layers laminated and/or brazed together using a number of adhesive layers, a printhead structure in accordance with embodiments of the present teachings can be fabricated as one or a few cohesive parts. This process thus can form a printhead structure including one or more internal ink channels or passageways for the flow of ink through a printhead. The printhead structure can include a printhead diaphragm and PZT layer to form a front end of a printhead jet stack. Further, embodiments of the present teachings can reduce the number of printhead components and interfaces compared to some other processes, and may have reduced manufacturing complexity and cost with improved yield and lifetime.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with, respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. A method for forming a printhead, comprising one or more channels, the method comprising:
   selectively sintering a first layer of powder comprising a material to form a first sintered layer, wherein the first sintered layer forms a first cross-sectional region of a printhead structure for the printhead;
   depositing a second layer of powder comprising the material directly onto the first sintered layer;

selectively sintering the second layer of powder to form a second sintered layer integrally bonded to the first sintered layer and to form at least a portion of at least one of the one or more channels, wherein the second sintered layer further forms a second cross-sectional region of the printhead structure for the printhead adjacent to the first cross-sectional region; and depositing and selectively sintering one or more additional layers of powder comprising the material to form one or more additional sintered layers until the printhead structure is formed, wherein the one or more channels are configured for flowing ink through the printhead structure, and the one or more channels form openings on at least one surface of the printhead structure for the printhead.

2. The method of claim 1, wherein selectively sintering the first layer of powder further comprises:

depositing the first layer of powder onto a diaphragm layer of the printhead structure, wherein the diaphragm layer includes one or more diaphragms; and selectively sintering the first layer of powder to form the first sintered layer and to integrally bond the first sintered layer to the diaphragm layer.

3. The method of claim 2, further comprising:

attaching one or more actuators to the one or more diaphragms.

4. The method of claim 2, further comprising:

attaching an aperture plate to a surface of the printhead structure away from the diaphragm layer, the aperture plate comprising a plurality of nozzles adjacent to one or more of the openings of the printhead structure.

5. The method of claim 1, wherein the depositing of at least one of the layers of powder and the selective sintering of the at least one of the layers of powder forms at least a portion of a printhead diaphragm, wherein the printhead diaphragm is configured to flex and expel a quantity of ink from at least one of the chambers during use of the printhead.

6. The method of claim 1, wherein the material comprises a metal.

7. The method of claim 6, wherein the material comprises at least one of stainless steel, tool steel, aluminum, titanium, copper, nickel-base superalloy, or cobalt-chromium alloy.

8. The method of claim 1, wherein at least one of the first layer, the second layer, or the additional layers of powder comprises a plurality of 20 µm particles of the material.

9. The method of claim 1, wherein at least one of the first layer, the second layer, or the additional layers of powder comprises a plurality of 4 µm particles of the material.

10. The method of claim 1, wherein selectively sintering the first layer of powder further comprises:

laser sintering the first layer of powder to form the first sintered layer.

11. The method of claim 1, wherein selectively sintering the second layer of powder further comprises:

laser sintering the second layer of powder to form the second sintered layer.

12. The method of claim 1, further comprising:

selectively sintering at least one of the first, second, or additional layers to form one or more particle filters in at least one of the one or more channels in the printhead structure.

13. The method of claim 1, further comprising:

attaching a polymer layer to the printhead structure to form one or more particle filters in the one or more channels in the printhead structure.

14. A method for forming a printhead, comprising one or more channels, the method comprising:

depositing and selectively sintering a first layer of powder comprising a material into a sintered layer that forms a first discrete cross-sectional region of a printhead structure for the printhead; and sequentially depositing and selectively sintering a plurality of layers of powder comprising the material into a plurality of sintered layers that form discrete cross-sectional regions of the printhead structure for the printhead and form at least a portion of at least one of the one or more channels, wherein each of the plurality of layers of powder is deposited directly onto at least one sintered layer and each of the plurality of sintered layers is integrally bonded to at least one other sintered layer, wherein the one or more channels are configured for flowing ink through the printhead structure, and the one or more channels form openings on at least one surface of the printhead structure for the printhead.

* * * * *